O. A. KALBFUS.
VACUUM CLEANING MACHINE.
APPLICATION FILED SEPT. 27, 1919.

1,349,964.

Patented Aug. 17, 1920.
3 SHEETS—SHEET 3.

Inventor
Oliver A. Kalbfus
By Henry F. Brewington
Attorney

UNITED STATES PATENT OFFICE.

OLIVER A. KALBFUS, OF BALTIMORE, MARYLAND.

VACUUM CLEANING-MACHINE.

1,349,964.　　　　　Specification of Letters Patent.　　Patented Aug. 17, 1920.

Application filed September 27, 1919. Serial No. 326,905.

*To all whom it may concern:*

Be it known that I, OLIVER A. KALBFUS, a citizen of the United States, residing at Baltimore city, State of Maryland, have invented certain new and useful Improvements in Vacuum Cleaning-Machines, of which the following is a specification.

This invention relates to street cleaning apparatus or machines, and its object is to provide a novel and improved suction means operating in conjunction with a brush for thoroughly and expeditiously effecting removal of all refuse from streets.

The object stated is attained by means of a combination and arrangement of parts to be hereinafter described in detail, and while the preferred embodiment of the invention has been disclosed, it will be understood that various changes and modifications may be made without a departure from the spirit and scope of the invention as claimed.

In order that the invention may be better understood, reference is had to the accompanying drawings forming a part of this specification, and in said drawings, Figure 1 is a plan view of the invention partly in section;

Figure 1:
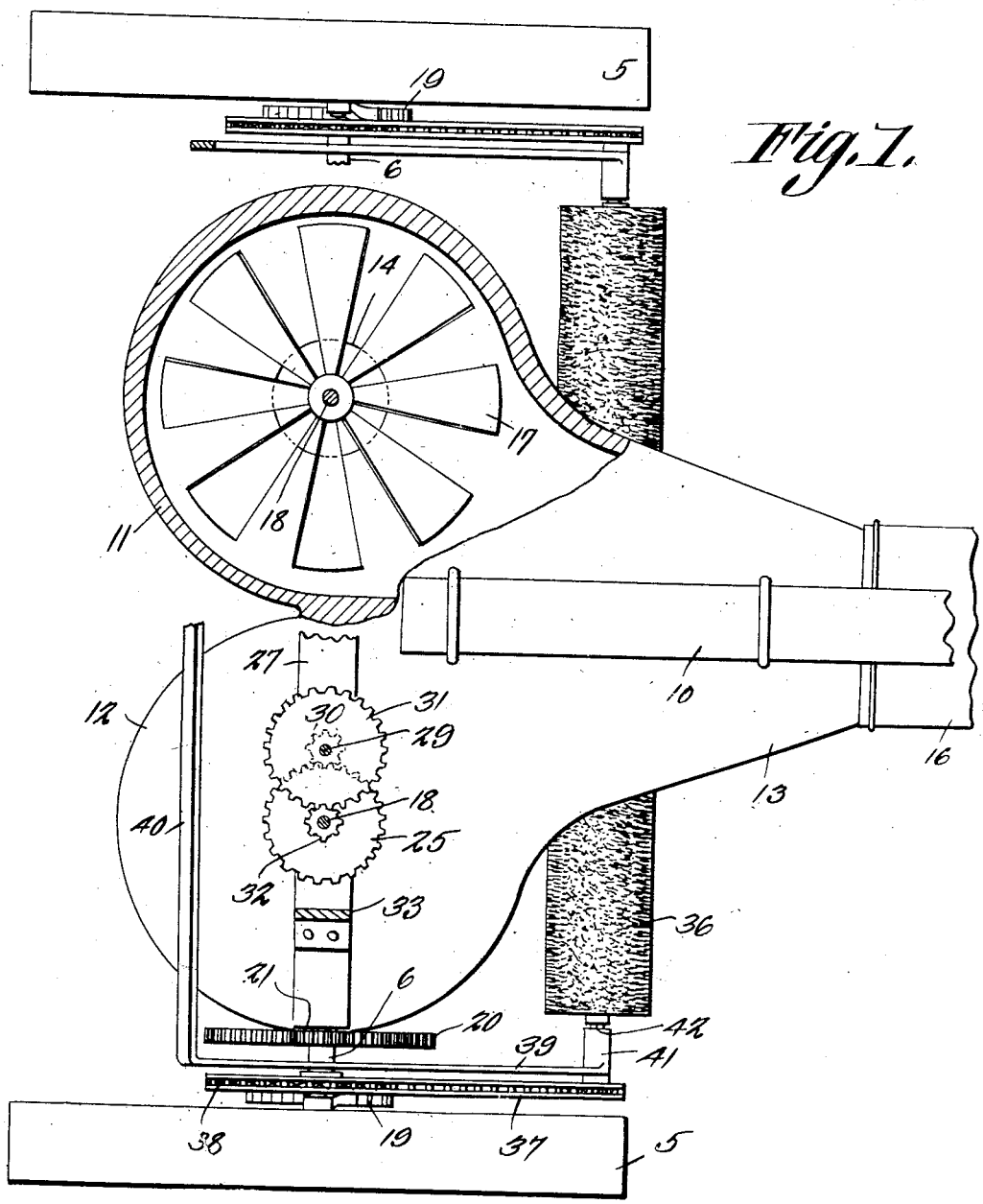
Figure 2:
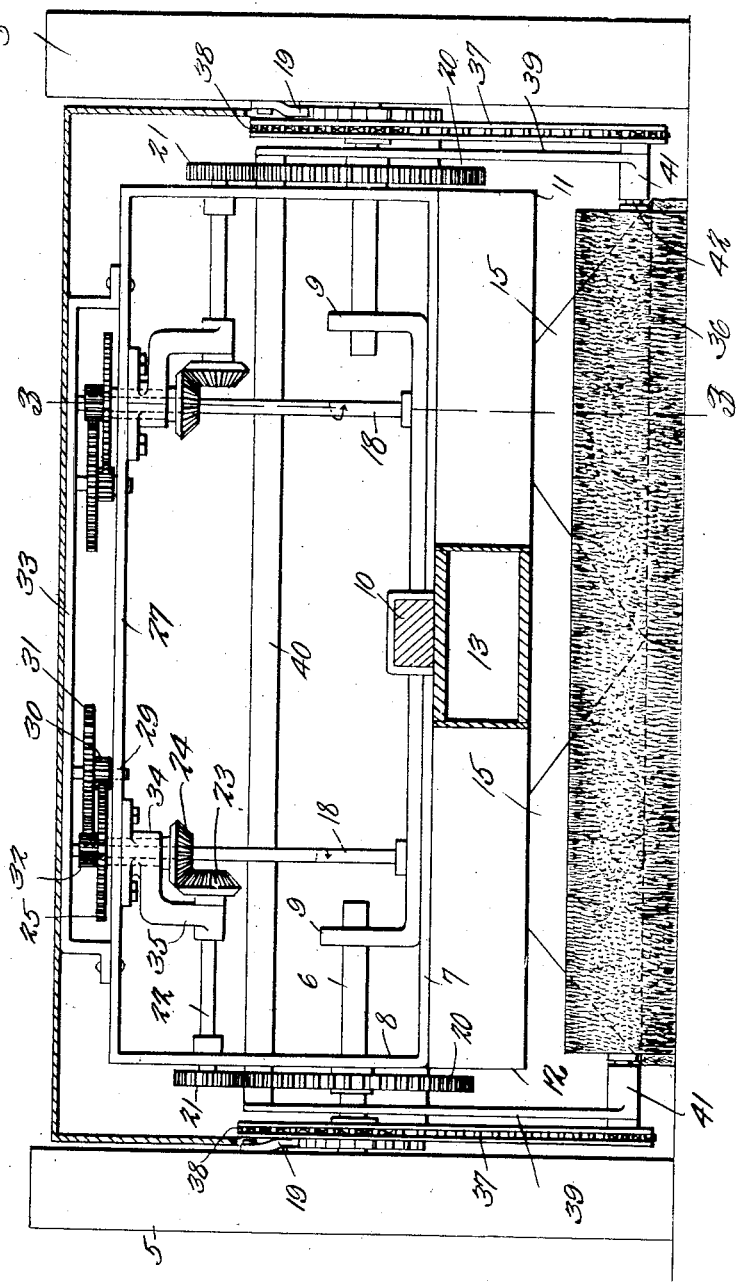
Fig. 2 is a front elevation.

Referring specifically to the drawings, the apparatus is supported on two wheels 5 which turn loosely on stub axles 6 carried by a suitable frame work including a base 7 having upright end portions 8. The base 7 also carries supports 9 for the inner ends of the stub axles 6. A draft tongue or pole is shown at 10, for attachment of the apparatus to draft animals, or to a tractor or other self-propelled vehicle. It is immaterial to the invention how the apparatus is propelled.

On the bottom of the base member 7 of the frame is mounted a suction casing divided into two compartments 11 and 12, respectively, having a common outlet trunk 13 extending forwardly, and to which the draft tongue or pole 10 is attached. Over an opening 14 in the bottom of each compartment is mounted a suction head 15 which opens downward so that its mouth or inlet is located close to the ground. The inlet end of the suction head carries a depending flexible apron 16 extending completely around the same and being of such length as to drag over the ground.

In each one of the compartments 11 and 12 is mounted a fan 17 carried by a vertical shaft 18 extending into the compartment. One fan shaft is driven by one of the wheels 5, and the other fan shaft is driven by the other one of said wheels. As stated hereinbefore, the wheels 5 are loose on the stub axles 6, the latter obtaining motion from the former by pawl-and-ratchet connections 19 of conventional design.

Inasmuch as the driving gears of the two fan shafts 18 are alike, a description of one suffices for both.

On the axle 6 is made fast a spur gear 20 which meshes with a pinion 21 on a shaft 22 provided with a bevel gear 23 which is in mesh with a bevel gear 24. On the fan shaft 18 is loosely mounted a spur gear 25 having an elongated hub 26 to which the bevel gear 24 is made fast. On a top cross member 27 connecting the frame uprights 8 is supported a stub shaft 29 provided with a small pinion 30 and a large spur gear 31. The gear 25 is in mesh with the pinion 30, and the gear 31 is in mesh with a pinion 32 fast on the upper end of the fan shaft 18.

The fan shaft 18 obtains motion from the wheel 5 and its axle 6 through the hereinbefore described train of gears, and it is driven at a high rate of speed to produce the necessary suction required for the successful operation of the apparatus.

The frame member 27 carries a support 33 for the upper ends of the shafts 18 and 29, and also carries a bearing 34 for the sleeve or hub extension 26 of the gear 25, said bearing having a branch 35 which supports one end of the shaft 22, its other end being supported by the frame member 8.

In front of the suction heads 15 is located a rotary brush 36 extending cross-wise of the apparatus and traveling on the ground to loosen up the dirt, refuse, etc., so that it may be readily sucked up when the suction heads come over the same. The brush 36 is driven by chain 37 from sprocket wheels 38 on the axles 6.

The brush 36 is supported by beams 39 pivotally supported on the axles 6 and connected at their upper ends by a cross-bar 40. At their lower ends, the beams 39 have bearings 41 in which the shaft 42 of the brush is journaled. By pivotally supporting the brush in this manner it is left free to rise and fall, and thus ride easily over obstructions or uneven places in the street.

Figure 3:
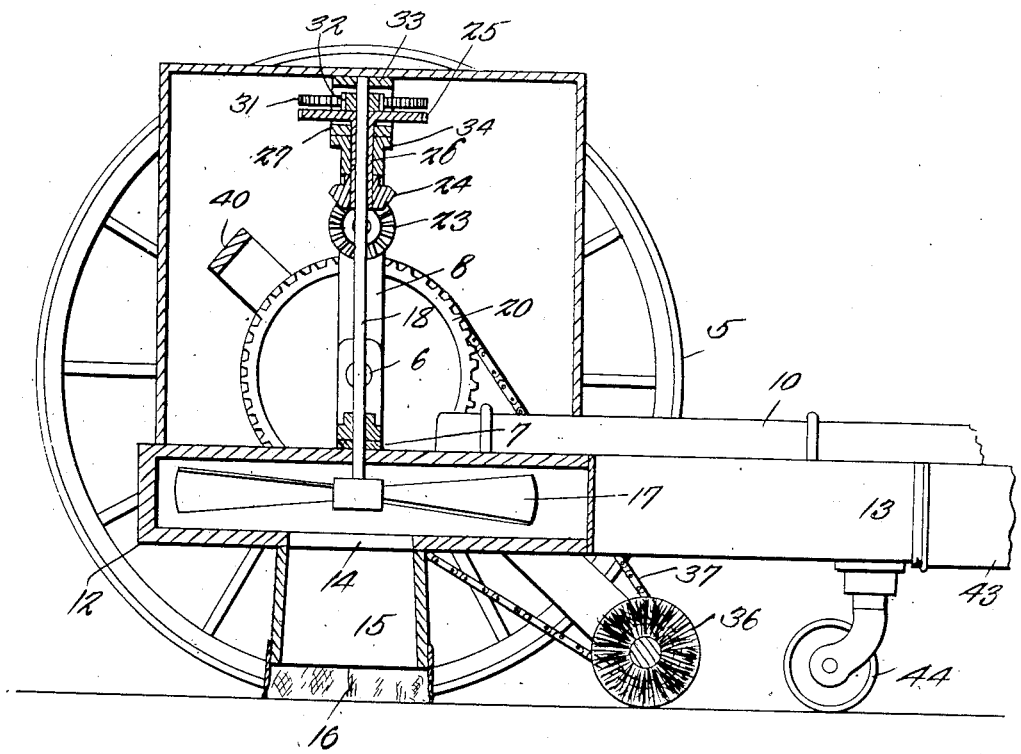
Fig. 3 is a vertical section on the line 3—3 of Fig. 2.

In operation, the brush 36 loosens up the dirt and refuse on the surface of the street, and the suction heads 15 following behind take up the same. A bag or other receptacle 43 fitted to the outlet 13 of the suction casing receives the dust, dirt and refuse drawn thereinto by the suction produced by the fans 17. The apparatus is highly efficient in operation and it operates automatically, it being necessary only to properly guide the same along the street. As shown in Fig. 3 of the drawings, the front end of the machine is supported by a caster wheel 44 carried by the forward end of the trunk 13.

I claim:

In a street cleaning machine, a frame, a pair of ground wheels supporting the frame, a suction casing carried by the frame and having separate compartments located alongside each other, an outlet trunk extending forwardly from said compartments, a caster wheel supporting the forward end of the trunk, a draft pole attached to the trunk, suction heads extending downwardly from the aforesaid compartments, fans operating in the compartments, a rotary brush located beneath the aforesaid outlet trunk and operating in front of the suction heads, and driving means for the fans and the brush operated by the aforesaid ground wheels.

In testimony whereof I affix my signature in the presence of two witnesses.

OLIVER A. KALBFUS.

Witnesses:
E. WALTON BREWINGTON,
HOWARD D. ADAMS.